(12) United States Patent
McIntyre et al.

(10) Patent No.: US 6,675,156 B1
(45) Date of Patent: Jan. 6, 2004

(54) ROBOTIC TELEPORTATION METHOD AND SYSTEM

(75) Inventors: Angus McIntyre, Paris (FR); Frédéric Kaplan, Paris (FR); Luc Steels, Paris (FR)

(73) Assignee: Sony France S.A., Clichy la Garenne (FR)

( * ) Notice: Subject to any disclaimer, the term of this patent is extended or adjusted under 35 U.S.C. 154(b) by 394 days.

(21) Appl. No.: 09/696,381

(22) Filed: Oct. 25, 2000

(30) Foreign Application Priority Data

Oct. 26, 1999 (EP) .............................. 99402667

(51) Int. Cl.⁷ .......................... G06F 15/18; G05B 19/04
(52) U.S. Cl. ......................................... 706/14; 700/250
(58) Field of Search ............................. 706/14; 700/250

(56) References Cited

U.S. PATENT DOCUMENTS

| | | | | |
|---|---|---|---|---|
| 5,944,783 A | * | 8/1999 | Nieten ......................... | 709/202 |
| 6,255,943 B1 | * | 7/2001 | Lewis et al. ................. | 340/506 |
| 6,314,555 B1 | * | 11/2001 | Ndumu et al. ............... | 717/101 |
| 6,446,076 B1 | * | 9/2002 | Burkey et al. ............... | 707/102 |

FOREIGN PATENT DOCUMENTS

| | | |
|---|---|---|
| WO | WO 98 44424 | 10/1998 |
| WO | WO 98 52109 | 11/1998 |

OTHER PUBLICATIONS

Oliveira E et al: "Negotiation and Conflict Resolution in a Multi–Agent System for an Assembly Robotics Cell" Proceedings of the International Conference on Systems, Man, and Cybernetics, US, New York, IEEE, 1994, pp. 605–611, XP000530724.

Lueth T C et al: "Task Description, Decomposition, and Allocation in a Distributed Autonomous Multi–Agent Robot System" Proceedings of the International Conference on Intelligent Robots and Systems (IROS), US, New York, IEEE, 1994, pp. 1516–1523, XP000510598.

Malec J: "Complex Behavior Specification for Autonomous Systems" Proceedings of the International Symposium on Intelligent Control, US, New York, IEEE, 1992, pp. 170–177, XP000340498.

Etzioni O et al: "A Softbot–Based Interface to the Internet" Communications of the Association for Computing Machinery, US, Association for Computing Machinery, New York, vol. 37, No. 7, Jul. 1, 1994, pp. 72–76, XP000485263.

\* cited by examiner

*Primary Examiner*—George B. Davis
(74) *Attorney, Agent, or Firm*—Frommer Lawrence & Haug LLP; William S. Frommer; Dennis M. Smid

(57) ABSTRACT

An autonomous system comprises an agent, constituting the behavioural identity of a robot, and a supporting device that is a physical installation which can implement the agent. The agent has a state which has a controlling influence on, and changes during, system operation. The agent's state is distinguishable from, and isolatable from, the permanent parts of the supporting device. The supporting device comprises hardware, software components for operating the hardware, software components for maintaining the agent environment and non-changing parts of the agent implementation, and software components for reading/writing the isolable agent state. An extraction module can extract the agent state and transform it into a representation for transmission across a network. An inserting module can insert a received agent state into the supporting device so as to embody a received agent on that supporting device.

15 Claims, 3 Drawing Sheets

ROBOTIC TELEPORTATION METHOD AND SYSTEM

BACKGROUND OF THE INVENTION

1. Field of the Invention

The present invention relates to a robotic teleportation method and to a teleportation system for autonomous robotic agents.

In present practice, a robot has a physical architecture (body, sensors, actuators) and a control program executed on a computer or special-purpose electronic device that gives the robot its functional capabilities. The robot is called autonomous if it executes these control programs without human intervention and if it adapts its control programs to be maximally adapted to its environment and tasks. The control program is generally associated with a specific physical body, particularly if the control program has been specialized by adaptation, learning mechanisms or other means to individualize the robot.

2. Technical Background

There are several related concepts and mechanisms which act as background to the present invention.

There has been significant work in the area of tele-operated robots, where a human can control a robot from a distance. In this case, the sensory states of the robot are extracted and sent through a data transmission system to another physical location for interpretation by a human operator. The human operator then sends control commands to the robot attain through a data transmission network. Teleoperation requires a robotic architecture in which sensory and actuator states are made accessible to outside processes. In the case of teleoperation, the robot is not autonomous because it remains under human control. Accordingly, in teleoperated robots, the control program is not executed by the robot itself on local computational resources without human intervention.

Another relevant area with a significant state of the art is that of net-mobile programs. These are computer programs that can be transferred between host devices across a network, and then executed on a local device. A Java applet, for example, is a portable computer program that executes in a host device (typically a Web browser). However, a net-mobile program such as a Java applet that implements a button or an image map is not autonomous; it is downloaded on demand, responds to user actions, and is then purged from memory when the user moves on. Moreover, a net-mobile program is not persistent, i.e. the net-mobile program does not have a definite lifetime which lasts more than a single invocation and in the case of mobile programs, there is no need to adjust their internal states.

A third relevant area of prior work is concerned with software agents. Software agents are systems that exhibit autonomy and persistence and thus capture some of the properties of teleportable agents. Various proposals have been made for software agents and various experiments have been carried out.

There are two significant differences here. First, mobility is not a necessary characteristic of software agents. Many software agents are not transferred between host devices at all. Others may exhibit what we call pseudo-mobility they make use of data drawn from remote sources, but are not themselves transferred. The <<spiders>> or <<crawlers>> used to index the World Wide Web are examples of pseudo-mobile programs; they make use of remote data, but despite their name—with its suggestion of movement—transfer from one host to another prior to execution plays no part in their normal way of operating. A smaller number of agents may be truly mobile but it is clear that mobility is not an inherent part of the definition of a software agent.

The second, and much more important distinction, is that software agents are typically not grounded. They operate within an information space which is defined by stored data, not by data derived in real time from sensors or actuators.

SUMMARY OF THE INVENTION

The present invention aims at dissociating the functional capabilities and thus the behavioral identity of the robot from its physical embodiment in such a way that it can be sent over a data transmission network such as the Internet and downloaded (materialized) or extracted (dematerialized) in different robotic bodies. Such a capability is called agent teleportation. The behavioral identity of a robot is called the agent, and the physical installation in which an agent can be embodied is called the robot body. A teleportable robotic agent is an agent which can be embodied into a robot body as well as travel over a data transmission network.

Robotic teleportation has a wide range of possible applications. Physical robot bodies linked through the Internet are expected to become common place in the future, and individuals will own agents which can operate these robotic structures but are not tied to a single physical robot. Such agents can do tasks in the physical world or interact with other embodied agents in many different physical locations without the need to travel physically from one location to the next.

For example. <<pet robots>> which have the capacity for autonomous movement and basic sound and vision acquisition devices (such as the dog-shaped miniature Aibo robot, made by Sony Corporation) are increasingly coming to tile market. Based on the invention described in this application, such small mobile robots could connect intermittently to a network in order to download agents which act as control programs for the robot. Under direction from the controlling agent, the robot explores its immediate surroundings. The image and sound data that it captures are used to allow the agent to <<learn>> (e.g. by constructing maps of the world, or learning—in interaction with other robots or human users—names for identifiable objects like faces in the world). The robot can then connect to a network access port and upload the agent and its newly-acquired knowledge about the world. This opens possibilities for backup, maintenance, monitoring, and upgrading of agents without the need for users to manually save or restore agents or install new software. Moreover owners of pet robots could exchange agents or parts of agents, or individuals could have agents interact in other locations thus increasing the entertainment potential of pet robots.

Another application is in speech. A speech system can be seen as an agent that controls a synthesizer and perceives human speech through a microphone. In contrast to much of current technology, we expect future speech agents to continuously adapt and specialize to the human speech in their environment. This means that their internal states change to record new words, new pronunciations, etc. By the invention described in the present application it is possible for individuals to own a speech agent which is highly adapted to their speech or to the speech of people that the individuals have to interact with. Such a speech agent can install itself on any machine that has the appropriate hardware in a location where its user is physically located. It is also possible for speech agents that have been in other environments to install themselves somewhere where their expertise is most needed and act as transcribers.

Briefly, the present invention applies to grounded mobile agents and differs from teleoperation in that the agent is autonomous, pursuing its defined goals independently of a human operator. Thus, according to the present invention, the control program is executed by the robot itself on local computational resources without human intervention.

The agents according to the invention differ from standard net-mobile programs in that they are also persistent. Their internal state and structure is maintained between invocations. Thus an assent has a definite lifetime which lasts more than a single invocation of the agent. Moreover, autonomous agents must be able to adjust their own representations and internal states as they learn through a series of successive interactions.

The agents according to the invention further differ from conventional software agents in that they are necessarily mobile and necessarily grounded. Thus, the agents are embodied in the real world and have to control and perceive the world through physical devices. Because these agents have to handle the stochasticity inherent in real world environments, it will never be possible to fully program them and have them in a static state. Rather, they necessarily adapt and specialize to deal with certain types of environments. These defining characteristics impose specific requirements on a supporting system.

More specifically the aims of the present invention are obtained by a method for converting a first system consisting of a physical architecture and interlinked hardware and software components and defining a server system into at least a second system consisting of a physical architecture and interlinked hardware and software components and defining a client system, each of the first and second systems comprising at least an agent defining functional capabilities constituting the behavioral identity of a robot and a robot body constituted by the physical installation in which agent can be embodied, characterized in that the conversion between the first and second systems is achieved by agent teleportation through a data transmission network, each agent being represented by an isolable agent state comprising a collection of information which is subject to change during the operation of a system of which it is part, which has a significant controlling influence on the operation of that system and which may be isolated and distinguished from permanent parts of the system which constitute a supporting device, wherein during the conversion of the first system into the at least second system each agent is temporarily converted into a serialized representation that can be transmitted over the data transmission network, the downloading of an agent requested by the client system to the server system is achieved using a stateless request/response protocol and a pair of message tokens and the uploading of an agent present to the client system to be sent to the server system is also achieved using a stateless request/response protocol and a pair of message tokens.

According to a specific embodiment, the stateless request/response communication protocol used for downloading or uploading an agent is an HTTP protocol.

According to an aspect of tile present invention the downloading of an agent requested by the client comprises the following steps a) providing in the server system a queue of waiting agents to be delivered to the client system, b) having the client system transmit a GET-NEXT-AGENT request to the server system, c) having, a first waiting agent to be sent to the client system as a response to the GET-NEXT-AGENT request transmitted by the client system, d) checking whether the first waiting agent is already present in the client system and ignoring this agent if the answer is yes, e) installing in the client system the first waiting agent if this agent is not yet present and sending an AGENT-PRESENT signal to the server system to indicate that the agent has been received wherein the received assent is removed from the queue upon receipt of the AGENT-PRESENT signal by the server system.

f) repeating the steps b) to e) for having all the requested subsequent waiting agents sent from the server system to the client system until the server system emits a <<no-more-agents>> token.

According to another aspect of the present invention, the uploading of an agent present in the client system comprises the following steps a) providing in the client system a queue of waiting agents to be delivered to the client system, b) having the client system transmit an IS-AGENT-PRESENT request to the server system for the first waiting agent, c) having the first waiting agent deleted from the queue in the client system if the answer from tile server system to the IS-AGENT-PRESENT request is <<yes>>, d) having the first waiting agent sent to the server system with an UPLOAD-AGENT signal and deleted from the queue in the client system if the answer from the server system to the IS-AGENT-PRESENT request is <<no>>, e) repeating the steps b) to d) for each next first waiting agent in the client system until all waiting agents are deleted from the queue of waiting agents in the client system.

According to a possible application, a server system co-operates with a plurality of client systems.

In a specific embodiment, the server system is a passive system which merely responds to messages sent by the client systems without initiating a connection.

The present invention also relates to an autonomous system comprising at least an agent defining functional capabilities constituting the behavioral identity of a robot and a supporting device constituted by the physical installation in which an agent can be embodied, characterized in that the supporting device comprises hardware components, software components concerned with the general operation of the hardware components of the device, software components concerned with maintenance of the agent environment and those parts of the agent implementation that do not change and software components concerned with reading, and writing an isolable agent state which is subject to change during the operation of the system of which it is part, which has a significant controlling influence on the operation of that system and which may be isolated and distinguished from permanent parts of the supporting device, the autonomous system further comprising extraction means for extracting the state of the isolable agent state and transform it into a representation which can be transmitted across a network and inserting means for inserting a received transmitted state into the supporting device in such a way as to embody the received agent on that supporting device.

More specifically, tile agent state contains data that can be used in calculations performed by code defined in the core agent implementation as well as code and data representing the configuration of the hardware substrate.

According to a specific embodiment extractor means comprise means for reading parts of the supporting device's memory in which key elements of the agent state are defined and means for converting the data found therein into a text or binary stream suitable for transmission.

According to another aspect, the inserting means comprises means for interpreting the transmitted data received and means for updating the memory of the target supporting device in such a way as to embody the agent on that device.

The autonomous system according to the invention may constitute either a server system co-operating with at least one client system or a client system co-operating with at least one server system.

BRIEF DESCRIPTION OF THE DRAWINGS

Further features and advantages of the present invention will become apparent from the description below given in association with the accompanying drawings, in which.

DETAILED DESCRIPTION OF THE PREFERRED EMBODIMENTS

1. Agent Architecture

Figure 1:
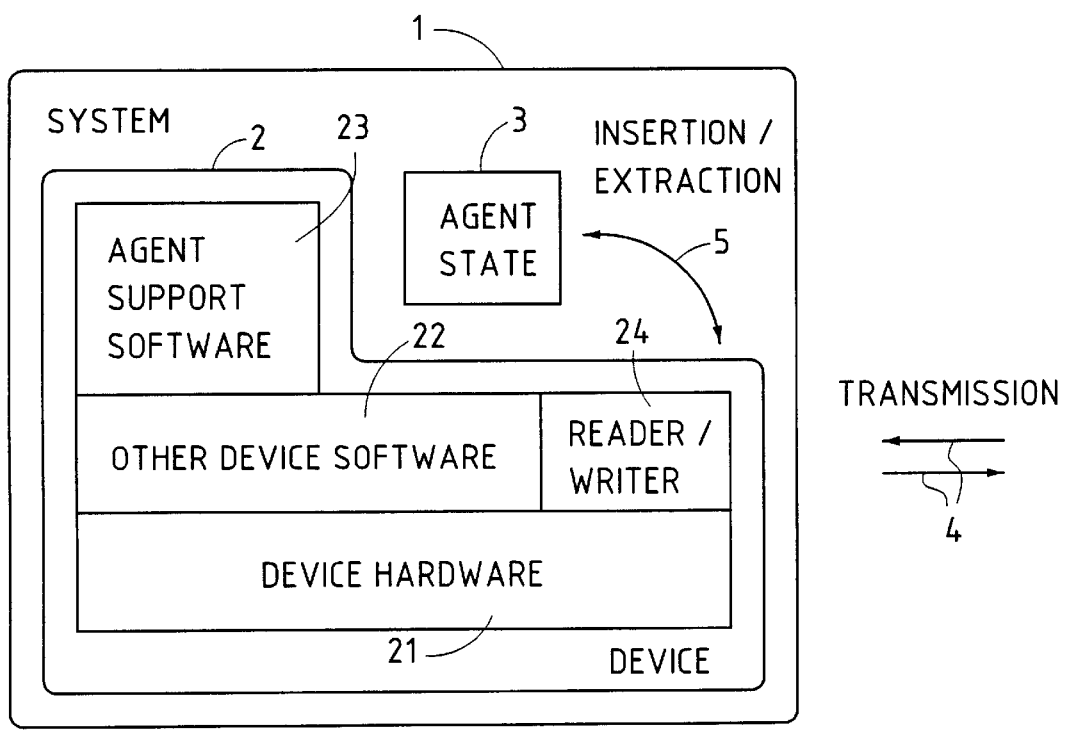
FIG. 1 is a diagram illustrating the architecture of an autonomous system according to the invention.

In order to make agents teleportable, two conditions must be met:

(1) Given a complete system that consists of interlinked hardware and software components, it must be possible to identify the software elements (control programs and data) which define the state of the agent, with all its learned behaviors and information.

(2) It must be possible to translate the complete state into a form which can be written out and then re-read. The re-reading of the agent's state into a suitable host hardware/software device must produce a complete system which—within the limitations imposed by the device—is functionally equivalent to the system from which the agent was extracted.

1.1 The State of the Agent

Consider a host device which we call D. Such a device may have both hardware components H and software components S. If an agent representation or state A is added to device D, the whole constitutes a complete system $\Sigma$.

Consider now a network that contains two identical devices $D^1$ and $D^2$, and an agent representation $A^1$. The combination of device $D^1$ and agent representation $A^1$ constitutes a complete system $\Sigma^1$. If we now transfer the agent description $A^1$ to device $D^1$, the resulting system $\Sigma^2$ will be functionally equivalent to system $\Sigma^1$. (It is not a requirement of the present invention that agents should transfer only between identical devices; device $D^1$ and $D^2$ may also be non-identical, producing non-equivalent systems $\Sigma^1$ and $\Sigma^2$; the example is given merely to illustrate the fact that the agent representation is a transferable component which, taken together with a supporting device, constitutes a system).

From this, it follows that the complete agent representation is the minimal unit which may be transferred between two identical devices in such a way as to produce equivalent systems. Informally speaking, the agent representation consists of everything present in the complete system $\Sigma^1$ that is not present in the target device $D^2$ and which must be transferred to $D^2$ in order to create $\Sigma^2$.

The agent representation is also the unit of change. For this reason, we speak of the state of an agent. As stated earlier, agents are persistent. The interaction of an agent with the world—through the device on which it is embodied—leads to changes in the internal data structures and program code of the agent. These changes are permanent or semi-permanent in nature, and will determine or influence the agent's future behavior. They are thus distinct from—for example—temporary variable bindings during execution which are forgotten once the calculation has been completed, and from the <<permanent>> parts of any supporting system, which are not susceptible to modification as a result of execution.

In passing, it should be noted that the hardware component of a device is not necessarily immutable. Imagine a device that has an array of sensors disposed in a particular configuration. As a result of learning or optimizing mechanisms, an agent may adjust the configuration in order to better capture sense perceptions from the world. This new configuration is a necessary part of the whole system and is required to allow it to function effectively but it cannot be transferred via a network. Instead, we need to transfer a representation of that configurations, to allow the configuration to be reproduced on other compatible devices. The agent representation may thus include details of required configurations of the underlying, hardware and software substrate—the device—as well as the agent's own <<knowledge>>—the data and algorithms unique to that agent and used in tile course of its calculations.

To sum up, the agent state or representation is a collection of information which:

is subject to change during the operation of a system of which it is part, has a significant controlling influence on the operation of that system, may be isolated and distinguished from the <<permanent>> parts of tile system.

may be added to a suitable supporting device to create a new complete system.

1.2 Extraction and Insertion Processes

Given an isolable agent state, we next need:

a way to extract this state and transform it into a representation which can be transmitted across a network.

a way to reinsert the transmitted state into a target device.

In practice, the technical challenges posed by this requirement can be met relatively easily. An extractor component can be constructed to read the relevant parts of the host device's memory—i.e. the parts in which the key elements of the assent state are defined—and convert the data found therein into a text or binary stream suitable for transmission. At the <<other end>>, an insertion component may interpret the transmitted data and use it to update the memory of the target device in such a way as to <<embody>> the agent on that device.

There are no presuppositions about the most suitable form for data transmission. The agent state might be transmitted in the form of a direct memory dump, or as structured text in a format such as XML, or as a procedural <<recipe>> which could be executed to recreate the agent. The key point here is not how the extraction and reinsertion is to be done, but that there should be components available to do it. Without such components, the system cannot work.

1.3 Architecture

FIG. 1 summarizes the required components of the system 1. The supporting device 2 is composed out of both hardware (components 21) and software components 22, 23, 24. Within the software component are specialized subparts 22 concerned with the general operation of the device, specialized subparts 23 concerned, with maintenance of the agent environment and those parts of the agent implementation that do not change, and, specialized subparts 24 concerned with reading and writing the agent state. The agent state itself 3 will at a minimum, contain data that can be used in calculations performed by code defined in the core agent implementation. It may also contain code (for example, fragments of program code constructed by genetic programming, or special purpose code selected or developed for that agent by its owner) and data representing the configuration of the hardware substrate. On FIG. 1, the arrow 5 represents the insertion/extraction process between the agent state 3 and the supporting device 2 whereas the arrows 4 represent the transmission process between the whole system 1 and another similar system.

Having thus outlined the essential elements of the device architecture, the mechanism of teleportation and the characteristics of the teleporting network will now be described.

2. The Teleportation Mechanism

In this section, the architecture designed to support the transfer of intelligent absents between servers will be considered.

2.1 Requirements

In general terms, the requirements for transmission of an agent are the same as the requirements for transmission of any other piece of data. Techniques for transmission of data using error-correcting protocols are well understood, and existing solutions have proven remarkably robust.

The situation is complicated, however, when the agents transmitted are required to be persistent. In effect, managing, a world of persistent agents is a consistency maintenance task. The task of the communication protocols is essentially to ensure that the overall state of the network (and the agents that use it) remains consistent. The two main problems that must be avoided are data loss and incoherency.

D Data loss with respect to agents arises from the notion of an agent as an entity that has a certain kind of permanent or semi-permanent existence. If an agent were simply a computer program that was sent out to perform a processing task at a remote location and then abandoned, the issue of what might better be called <<agent loss>> would not arise. As an autonomous unit, however, an agent carries around with it the result of its own computations. It embodies the information that it has assimilated and the representations that it has constructed. Moreover, the types of agents that are considered are not deleted after a single use, but continue to move from host device to host device. When an agent leaves a host, the data representing the agent on that host is deleted. It is therefore crucial to ensure that the agent has been successfully received at the target host before it is deleted on the source host.

Incoherency is the inverse of agent loss. In this case, an agent is transmitted to a new target hosts but not deleted at the source host. There are now two copies of the agent in existence one which has continued to evolve and learn and another which represents a <<snapshot>> of an earlier state of the agent. Unless steps are taken to prevent it, the existence of two copies of the same agent may lead to conflicts which will be difficult to resolve.

The architecture proposed according to the present invention thus addresses these two main problems, trying, insofar as possible to ensure that agents are neither lost nor duplicated whilst being extremely simple.

2.2 Robust Transactions using Stateless Protocols

The system consists of a number of host devices (computers) able to communicate with each other over some communications channel (i.e. a network). The agents consist of serialized representations that can be transmitted over the network. The form of these representations is not important, but each must constitute a <<complete>> agent definition, sufficient to allow the agent to execute on the target platform.

Hosts on the network stand in a client-server relationship to each other. The relationship may be fixed, thus the client being always a client and the server beings always a server, but a peer-to-peer networking scheme could also be proposed in which each machine may be both client and server. Each transaction is initiated by the client, and consists of a request to which the server returns a response. A vocabulary of four message tokens understood by the server forms the basis of the teleportation mechanism.

2.3 Downloading Agents

To ensure data integrity during agent transfer, two possible approaches could be taken. One would be to define a protocol that implemented a kind of three-step exchange along the following lines:

1. Client issues a request,
2. Server issues a response,
3. Client confirms receipt of response.

In the case of downloading an agent, the client would request an agent, the server would return it, and the client would confirm receipt, whereupon the server could dispose of the storage used by the agent.

Such an approach is mole complicated than it needs to be, as it requires the implementation of a three-step protocol. Moreover, communication failures at any point risk leaving the system in an inconsistent state. As it turns out, according to a preferred embodiment of the invention the same effects may be achieved securely, using a simple stateless request/response protocol (such as HTTP) and a pair of message tokens.

Figure 2:
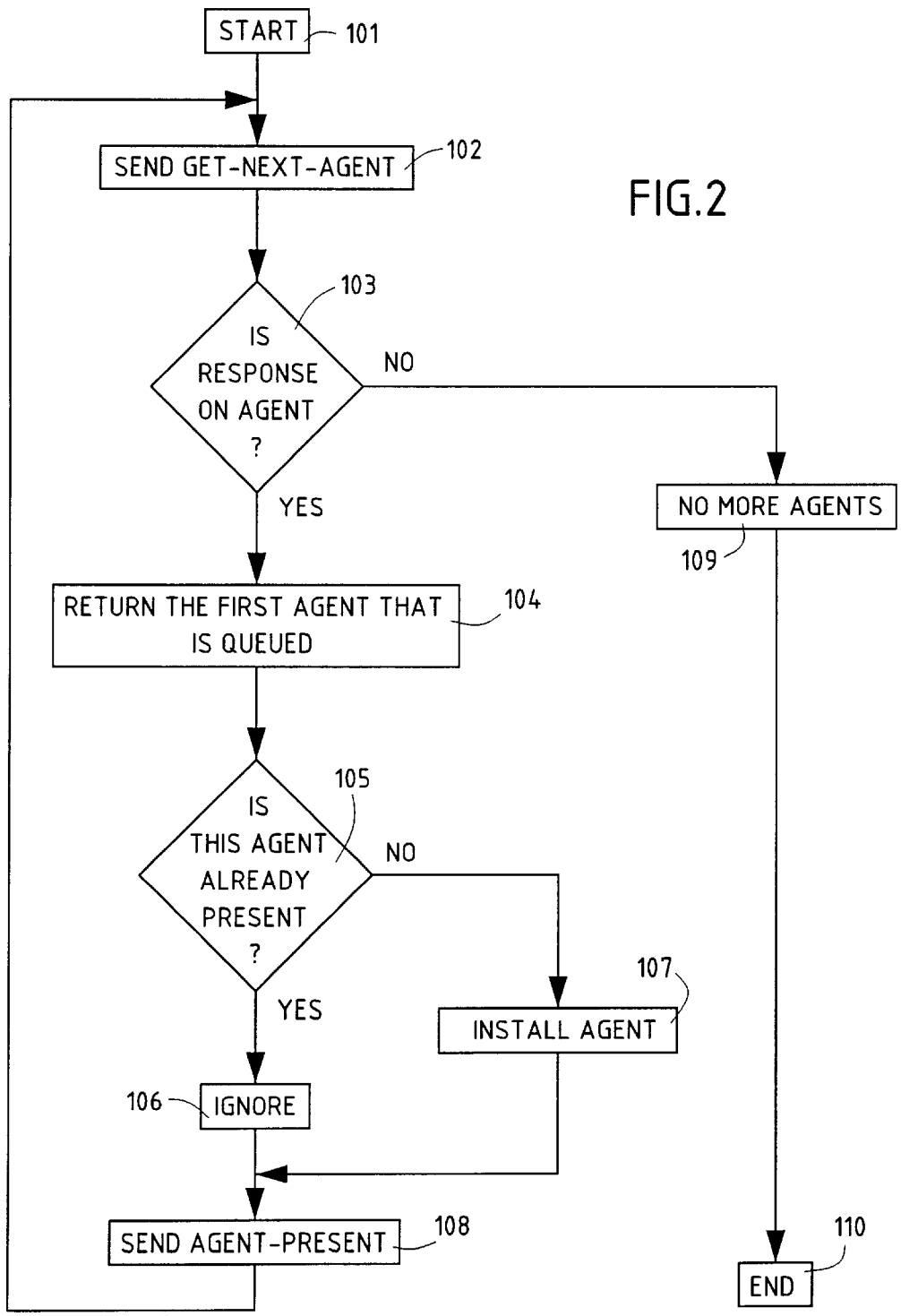
FIG. 2 is a flow diagram illustrating the general steps of the uploading of an agent present in the client system according to an aspect of the robotic teleportation method according to the invention.

The client can implement the task of fetching any waiting agents using the algorithm shown in FIG. 2 (presented in pseudo-code).

A queue of waiting agents to be delivered to the client system has been initially provided in the server system.

After start (step 101), the client system transmits a GET_NEXT_AGENT request to the server system (step 102). If an agent is available in the server system (the answer is yes to the test of step 103), a first waiting agent is sent to the client system and a response to the GET_NEXT_AGENT report transmitted by the client system (step 104).

It is then determined whether the first waiting agent is already present in the client system (step 105). If the answer is <<yes>>, this agent is ignored (step 106).

If the answer is <<no>> to the test of step 105, the first waiting agent is installed in the client system (step 107) and an AGENT-PRESENT signal is sent to the server (step 108) to indicate that the agent has been received, wherein the received agent is removed from the queue upon receipt of the AGENT-PRESENT signal by the server system.

The same steps are repeated for all the requested subsequent waiting agents sent from the server system to the client system until the server system emits a <<no-more-agents>> token (step 109) when the response to the test of step 103 is <<no>>. After the end of the repeated sequence, the Get Agents procedure comes to an end (step 110).

Thus, the server responds to the GET-NEXT-AGENT message (step 102) by returning the first agent that is queued for delivery to the client (step 104). If there are no more agents to send, it returns a <<no-more-agents>> token (steps 104 and 109).

Delivering an agent to a client does not cause the agent to be deleted or even removed from the queue. In fact, the agent remains in the queue and if the client sends another GET-NEX-AGENT signal it will be downloaded a second time. The agent is only deleted if the client explicitly sends an AGENT-PRESENT signal (step 108) to indicate that it has received the agent.

This system is robust, because it cannot cause an agent to be deleted prematurely, and it cannot cause an agent to be installed incorrectly.

- If an error prevents the server from receiving the GET_NEXT_AGENT request, the client request simply times out and the client tries again.
- If an error prevents the client from receiving the agent, the client request simply tries out and the client tries again.
- If an error prevents the server from receiving the AGENT_PRESENT signal, the agent is not removed from the queue, and the server responds by sending it again the next time it receives a GET_NEXT_AGENT request. However, when the client receives a second copy of the agent, the second copy is ignored (step 106), and a new AGENT_PRESENT request is sent, giving the server a second chance to see that the agent has been received and delete it.
- There is no uncertainty about whether the server has deleted the agent or not. As soon as the client receives a new agent in response to its GET_NEXT_AGENT request (step 102), it knows that its last AGENT_PRESENT request was successfully received, and that the server is no longer concerned with the preceding agent. Contrast this with the case in the three-step protocol, where the client has no way to check whether or not the server has received its confirmation—without adding another step to the protocol (or perhaps several).

The three-steps protocol could be made equally robust—but only by adding mechanisms similar to those that have been proposed above. By interleaving requests and using a stateless protocol, a secure system can be provided for agent transactions using <<off-the-shelf>> communications protocols such as HTTP.

2.4 Uploading Agents

Figure 3:
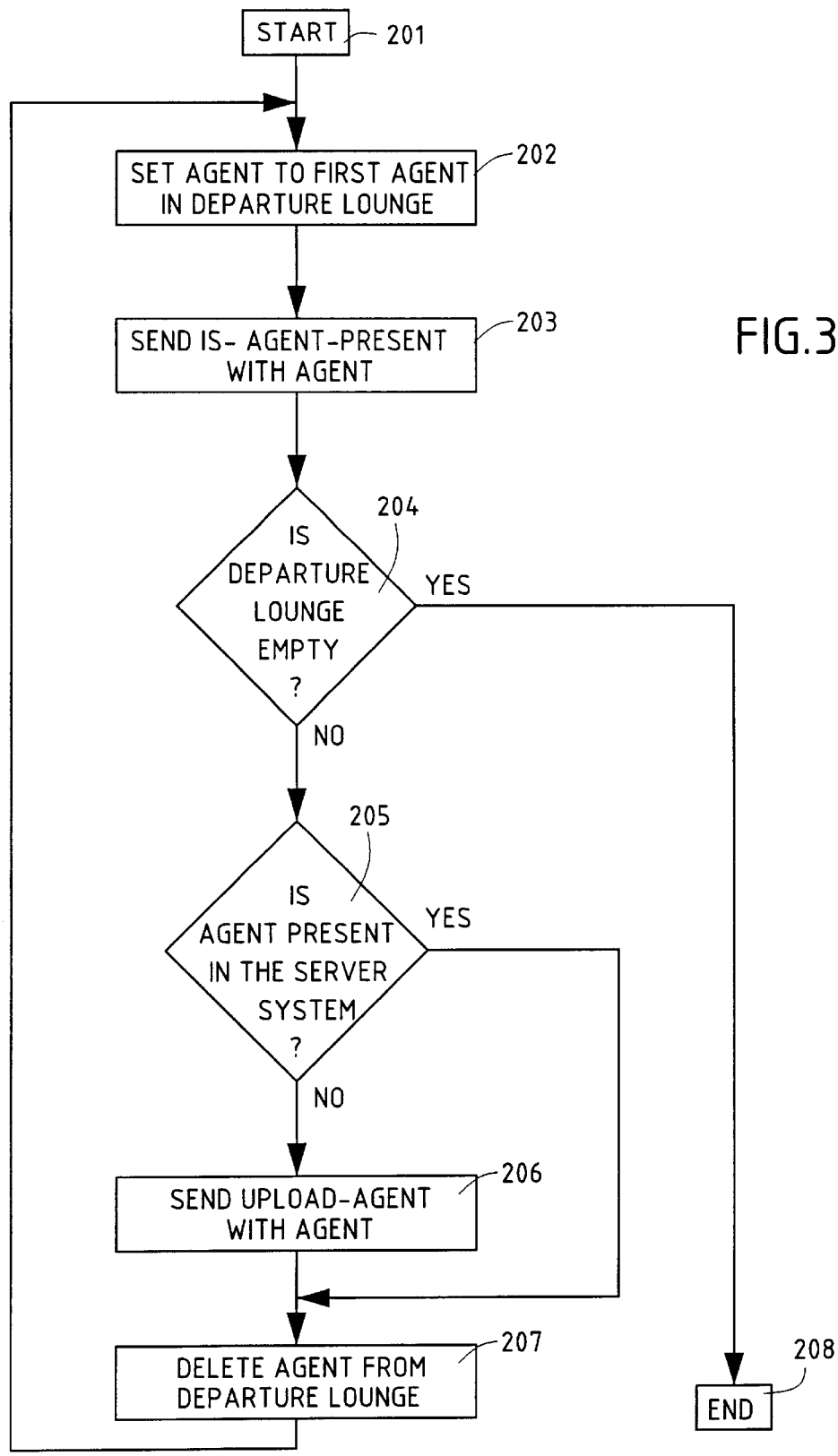
FIG. 3 is a flow diagram illustrating the general steps of the downloading of an agent requested by the client in the client system according to another aspect of the robotic teleportation method according to the invention.

The protocol for uploading agents is essentially similar. The client maintains a list of agents to be uploaded (referred to as the <<departure lounge>>, and interleaves UPLOAD_AGENT requests with IS_AGENT_PRESENT requests. The algorithm is shown in FIG. 3.

A queue of waiting agents to be delivered to the server system has been provided in the client system.

After start (step 201), the agent is set to first waiting agent in the departure lounge (step 202).

The client system transmits an IS_AGENT_PRESENT request to the server system for the first waiting agent (step 203).

If the departure lounge is empty (the answer is <<yes>> to the test of step 204), the Put Agents procedure comes to an end (step 208).

If the departure lounge is not empty (the answer is <no>> to the test of step 204), it is examined whether the answer from the server system to the IS_AGENT-PRESENT request is <<yes>> or <<no>> (step 205).

If the answer of step 205 is <<yes>>, the first waiting agent is deleted from the queue in the client system (step 207).

If the answer of step 205 is <<no>>, the first waiting agent is sent to the server system with an UPLOAD_AGENT signal (step 206) and then the first waiting agent is deleted from the queue in the client system (step 207).

The same process is repeated while departure lounge is not empty.

The server responds to an UPLOAD_AGENT request (step 203) by receiving and storing the agent, provided that agent is not already present. It responds to the IS_AGENT_PRESENT request by signaling <<yes>> or <<no>> based on whether the agent is present or not (step 205). Once again, the algorithm is robust.

- If the client does not receive a response to IS_AGENT_PRESENT, the client request times out and the client tries again.
- If the server does not receive the agent sent with UPLOAD_AGENT, it will respond <<no>> to the next IS_AGENT_PRESENT request, and the agent will be uploaded again.
- Because the client always checks to see if the agent is present before sending, the expense of a full agent transfer call be avoided if it is not necessary. Because an agent will not be retransmitted if it is already present, the case ill which the server receives a second copy of all agent never arises.
- When a client transmits a new agent, the server <<knows>> that the client has deleted the preceding agent and that the server is now responsible for managing that agent.

It is to be noted that the departure lounge needs to be implemented as a queue, with new agents for transmission being added to the end of the list. Only if agents are uploaded in strict order can the server assume that the successful receipt of a new agent indicates that the client is no longer managing the preceding agent.

2.5 Passive Servers

In the simplest model, the server is entirely passive. It never initiates a connection, but only responds to messages sent by the clients. There are several advantages to this approach. First, it removes the need for the client to run any server software, thus simplifying the implementation and reducing load on the client. Second, it allows servers to serve agents to clients without needing to know the location or even the existence of a client. This simplifies the task of the server because it needs not track multiple clients (clients usually stand in a many-to-one relationship to the server). It also simplifies the task of supporting mobile clients that connect to the network intermittently, potentially from a different location each time. Finally, it makes it easy for the server to offer agent routing as a service to arbitrary clients, including clients that have not been specifically <<configured into>> the server.

Although the simplicity of the approach has much to recommend it, in practice even a system in which the server was sometimes required to initiate transactions could be accommodated without too much difficulty.

2.6 Server and Client Failures

The transfer mechanisms outlined above offer generally good protection against agent loss or incoherency introduced during transmission. A more serious danger is posed by the possibility of a server or client failing. If a client crashes, the system may be left in an incoherent state because the client has no record of any agents being present, while the server has marked those agents as being located on the client.

A solution consists in a handshaking mechanism by which a client can communicate its state to the server on startup. The client signals the number and identity of the agents it has present to the server, and the server checks against its own model of the network state. In the event that they do not match, repair actions can be taken. A typical repair might be for the server to set the flag, for agent location to <<server>> instead of <<client>> for any agents of which the client has no record. These agents will then be redownloaded by the client.

A server crash is more serious, in that it is likely to involve a larger number of agents. Recovery is also complicated by the fact that the server cannot initiate communications. The best it can do is to mark all agents as located on the server and attempt to download them the next time the client sends a GET_NEX_AGENT request. Agents that are on the client already will be rejected, allowing the server to update its database properly. Depending on the timings of the crash, however, this may actually worsen matters. Consider the case of agent A sent initially to client $C^1$, then returned to the server and passed on to client $C^2$. When the server crashes and recovers, its database shows—incorrectly—that agent A should be on client $C^1$. It therefore offers the agent to client $C^1$ which accepts it, because A is indeed not present. The results that there are now two copies of A on the network, and the whole is incoherent. To overcome this problem, it may be necessary to assign unique IDs to each task (where a task is the transfer and execution of an absent on a client) and have the clients keep logs. A transfer attempt is then a tuple <A,T>, and a client can reject any agent embodiment which its own records show has already taken place and run to completion. On rejection of the transfer by client $C^1$, the server could update its database and attempt to offer the agent to client $C^2$. $C^1$ would also reject the transaction, but this time for a different reason—because the agent is present. Upon receipt of this rejection, the server now knows where the agent should be, and its database is again correct with respect to this agent.

2.7 Extensions to the Basic Mechanism

It will now be considered some of the ways in which this approach could be extended. In particular, we will consider extending the protocol for greater security, the possibility of peer-to-peer routing, and a <<blind routing>> technique that allows agents to move through a network whose topology and features are unknown.

2.7.1 Error Checking

One feature that has not been discussed above is any kind of verification of transmitted agent data (beyond the basic error checking provided by the underlying transport protocols). The interesting question here is not so much how to check the correctness of a transmitted agent (in the simplest case, checksums should prove adequate to detect corruption in transmission) but how to handle corruption when it occurs.

If a server detects that an agent has been corrupted, it should not simply install the agent and signal the client that the agent has been received. At the same time, it cannot report that the agent has not been received, for then the client will simply try to re-upload the agent again. If the agent has been corrupted on the client, rather than in transmission, this could lead to an infinite loop and block all other outgoing agents from that client.

An appropriate response is for the server to answer the IS_AGENT_PRESENT query with a <<damaged_agent>> token. The client may then be able to reconstruct or repair the agent locally before attempting to retransmit it. Failing that, it might abandon the agent and send a RESTORE_AGENT_FROM_BACKUP signal to the server, which would result in the agent being rebuilt on the server and then retransmitted to the client.

The situation when the client receives a damaged agent from the server is analogous; it has no means to reject an agent outright, but it can fail to install it, and issue a signal to the server advising it to take corrective action—report the error, verify the local copy of the agent, restore a copy from backup, etc.

The architecture must thus be designed in such a way as to try to detect damage to agents as early as possible, and prevent it propagating. For this reason, controls on both client and server are appropriate.

2.7.2 Peer-to-peer Routing

The model as discussed so far assumes a star topology, with a single central server. All agents pass through the server; an agent on its way from client A to client B is uploaded to the server by client A and left there until client B calls for it.

This is acceptable for small networks, but introduces a bottleneck. Failure of the central server can leave agents stranded, and as the number of clients grows, so will the load on the server.

One approach is to allow direct routing between clients. In this case, each host would be both client and server. When a host receives a request from another host, it acts as a server; when it needs to make its own requests, it acts as a client.

A problem with this approach is that it requires the client host to know the location of the host that it wishes to communicate with. We envisage,e agent transport networks as essentially fluid—a given logical agent host may not always have the same IP address, or even be running on the same computer. Client hosts that wish to access the services of other clients will clearly need assistance in locating them. For this a domain name service (DNS) system, able to dynamically propagate client locations across a network is needed.

2.8 Store-and-forward Routing

An alternative solution to the problem of creating a scaleable solution for large networks is to use a network of servers. The client uploads agents to its own immediate <<parent>> server. This server then takes responsibility for routing the agents onwards to other servers that are closer to their eventual destination. Much like standard Internet routing, the system can be made fault-tolerant by allowing intermediate servers to choose alternative routes for agents, based on server availability.

2.9 Service-based Routing

The system described earlier involves the use of client machines which are identified by name. Individual agents are routed from one machine to another by specifying the name of the destination host, and all destination hosts are assumed to be known to the agent's controller.

Another interesting possibility is to route agents by service. The agent's task description could specify the kind of resources that it required (and the sequence in which they were needed, where appropriate), and the server could take responsibility for routines agents to hosts that could provide those services.

This then raises the possibility that the <<service table>>—the list of hosts providing services—can also be constructed dynamically. Client machines announce their availability and the services they provided to the server, which tracks the available resources and performs load-balancing, distributing tasks among the available clients. There is even scope for a kind of parallelism, with agents configured to work on sub-problems and distributed across different clients.

A further extension of this idea is to allow the owners of local resources to be paid for the use of those resources. The network server would accept <<bids>> for the cost of provision of particular types of services. Agents arriving on the server would then be routed to client machines according to the level and price of service offered. The server would be responsible for ensuring that the different constraints specified by the agent's owner—speed of execution, total budget etc.—were satisfied.

3.5 Embodiment

The proposal describes a system in which a network of clients and servers exchange mobile grounded agents. The client devices provide the grounding by means of hardware—sensors, actuators—through which the agents can perceive or interact with the real world.

The implementation of a grounded mobile agent system is based on client devices equipped with steerable digital cameras, through which agents can perceive scenes in the real world. Each client device (a computer workstation and associated peripherals) is connected to two cameras. The software component is provided by an agent-management environment implemented in the Common LISP programming language. This environment provides the base implementation of the agents (i.e. the <<fixed>> agent code) needed to control the cameras, interpret the images returned, and interact with other agents. In addition, the environment schedules agent interactions, assigns access to the cameras, and manages the communication with the server (including the insertion and extraction functions discussed in section 1.2 to convert the agents to and from a transmittable form).

In this example, there are three client devices on the network and one server. The server maintains a database of agents in which information about the agent—name, creator, unique ID, destination, present location—is maintained. Each agent's record also contains the complete serialized description of the agent sent by the client. Communication between client and server takes place using the HTTP/1.1 protocol. The client calls CGI (Common Gateway Interface) scripts on the server, causing the server to receive or return information and to update its database.

Agents on the client device engage each other in interactions which we term guessing games. Each agent perceives a simple scene (by means of the cameras) and analyses the image to identify objects present. One agent then attempts to call the other's attention to a particular object by transmitting a referring expression (i.e. a short string consisting of one or more words) that uniquely identifies the object of interest. The other agent then indicates the object that it thinks was intended. If it has correctly identified the object, the game succeeds.

The system is used for experiments in the evolution of communication, in particular in the formation of shared languages and conceptual structures. As a result of the success or failure of interactions, the agents may learn new words or refine the structures that they use to interpret and categorize the images that they see. The vocabularies and classification structures built up in this way constitute the agent's unique <<knowledge>>, i.e. the absent state. Teleportation of agents consists of the transferences of this state between the different machines of the network. By moving from place to place across the network, agents can apply their learned structures to the different scenes that are visible from each of the clients.

The present invention thus allows autonomous robotic agents to teleport over a data transmission network so as to be backed up, maintained, upgraded, or used at other physical sites.

What is claimed is:

1. In a structure comprising a first system, a second system and a data transmission network,
   the first system comprising at least one agent, each said agent corresponding to a collection of data structures defining functional capabilities of a robot, said collection of data structures constituting a behavioural identity of said robot, said robot comprising a supporting device being a physical installation in which said agent can be embodied, at least some of said data structures being subject to change during operation of the robot, having a controlling influence on the operation of the robot, and being distinguishable from and isolatable from said supporting device, said at least some data structures constituting the state of the agent;
   a method for teleporting an agent from said first system to said second system through said data transmission network, the method comprising the steps of:
      converting the state of one of said at least one agents in the first system into a serialized representation that can be transmitted over said data transmission network, and
      transmitting said serialized representation from the first system to the second system over said data transmission network,
      wherein said conversion and transmission steps occur in a loading process achieved using a stateless request/response communication protocol and a pair of message tokens, said loading process being one selected in the group consisting of an agent-download process requested by the second system to the first system or an agent-upload process offered by the first system to the second system.

2. A method according to claim 1, wherein the stateless request/response communication protocol used for downloading or uploading an agent is an HTTP protocol.

3. A method according to claim 1, wherein the downloading of an agent requested by the second system comprises the following steps:
   a) providing in the first system a queue of waiting agents to be delivered to the second system
   b) having the second system transmit a GET-NEXT-AGENT request to the first system
   c) having a first waiting agent to be sent to the second system as a response system to the GET-NEXT-AGENT request transmitted by the second system
   d) checking whether the first waiting agent is already present in the second system and ignoring this agent if the answer is yes,
   e) installing in the second system the first waiting agent if this agent is not yet present, and sending an AGENT-PRESENT signal to the first system to indicate that the agent has been received, wherein the received agent is removed from the queue upon receipt of the AGENT-PRESENT signal by the first system,
   f) repeating steps b) to e) for having all the requested subsequent waiting agents sent from the first system to the second system until the first system emits a "no-more-agents" token.

4. A method according to claim 1, wherein the uploading of an agent present in the first system comprises the following steps:
   a) providing in the first system a queue of waiting agents to be delivered to the second system
   b) having the first system transmit an IS-AGENT-PRESENT request to the second system for the first waiting agent c) having the first waiting agent deleted from the queue in the first system if the answer from the second system to the IS-AGENT-PRESENT request is "yes"

d) having the first waiting agent sent to the second system with an UPLOAD-AGENT signal and deleted from the queue in the first system if the answer from the second system to the IS-AGENT-PRESENT request is "no", e) repeating steps b) to d) for each next first waiting agent in the first system until all waiting agents are deleted from the queue of waiting agents in the first system.

5. A method according to claim 1, wherein one of said first system and second system is a server system and said server system co-operates with a plurality of systems.

6. A method according to claim 1, wherein one of said first system and second system is a server system and the server system is a passive system which merely responds to messages sent by client systems without initiating a connection.

7. The teleportation method of claim 1, wherein an agent-download request is made by the second system to the first system, in a structure wherein the second system comprises a supporting device being a physical installation in which an agent can be embodied, said method further comprising the step of inserting the transmitted serialized agent state representation into said supporting device whereby to implement a robot having a behavioural identity corresponding to said teleported agent.

8. The teleportation method of claim 1, wherein an agent-upload offer is made by the first system to the second system, in a structure wherein the first system comprises a supporting device being a physical installation in which an agent can be embodied.

9. The teleportation method of claim 1, in a structure wherein each of said first system and said second system comprises a supporting device being a physical installation in which an agent can be embodied.

10. An autonomous system comprising:
at least one agent, each said agent corresponding to a collection of data structures defining functional capabilities of a robot, said collection of data structures constituting a behavioural identity of said robot, said robot comprising a supporting device being a physical installation in which said agent can be embodied, at least some of said data structures being subject to change during operation of the robot, having a controlling influence on the operation of the robot, and being distinguishable from and isolatable from said supporting device, said at least some data structures constituting the state of the agent, said agent, when embodied in a supporting device, having a core implementation in which first code is defined;

a supporting device in which one of said at least one agents is embodied so as to constitute a robot having a behavioural identity corresponding to the embodied agent, said supporting device comprising:
hardware components having a configuration which can be defined using second code and data,
software components for controlling general operation of said hardware components,
software components for maintaining an agent environment and parts of the agent implementation that do not change, and
software components for reading/writing said data structures of said agent that are subject to change during operation of the robot and that constitute the agent state;

extraction means for extracting the agent state and transforming the extracted agent state into a representation which can be transmitted across a data transmission network; and inserting means for inserting a received agent state into the supporting device whereby to constitute a robot having a behavioural identity corresponding to an agent having the received agent state.

11. An autonomous system according to claim 10, wherein the agent state contains data that can be used in calculations performed by said first code defined in the core agent implementation as well as said second code and data representing the configuration of the hardware components of the supporting device.

12. An autonomous system according to claim 10, wherein said supporting device includes a memory in which key elements of the agent state are defined, and said extraction means comprises means for reading parts of the supporting device's memory in which said key elements of the agent state are defined and means for converting the data found therein into a text or binary stream suitable for transmission.

13. An autonomous system according to claim 10, wherein the inserting means comprises means for interpreting the transmitted data received and means for updating the memory of the target supporting device in such a way as to embody the agent on that device.

14. An autonomous system according to claim 10, wherein it constitutes a server system co-operating with at least one system.

15. An autonomous system according to claim 10, wherein it constitutes a system co-operating with at least one server system.

* * * * *